United States Patent

Colchester et al.

[15] 3,674,797
[45] July 4, 1972

[54] PRODUCTION OF BIS-QUATERNARY SALTS OF 4:4'-BIPYRIDYLS

[72] Inventors: John Edward Colchester; John Gerard Carey; Michael David Taylor, all of Runcorn, England

[73] Assignee: Imperial Chemical Industries Limited, London, England

[22] Filed: Feb. 24, 1970

[21] Appl. No.: 13,801

[30] Foreign Application Priority Data

March 7, 1969 Great Britain......................12,175/69

[52] U.S. Cl. ...................................260/295 AM, 260/296 D
[51] Int. Cl. ....................................C07d 31/42, C07d 31/42
[58] Field of Search ..............................260/296 D, 295 AM

[56] References Cited

UNITED STATES PATENTS 3,405,135  10/1968  Colchester et al. ....................260/295

Primary Examiner—Alan L. Rotman
Attorney—Cushman, Darby & Cushman

[57] ABSTRACT

A process for the production of a 1,1'-disubstituted-4,4'-bipyridylium salt which comprises treating a 1,1'-disubstituted-1,1',4,4'-tetrahydro-4,4'-bipyridyl with a 2-alkyl-9,10-anthraquinone, the 2-alkyl-9,10-anthraquinone being such that the corresponding 9,10-anthraquinol can be oxidized to the substituted 9,10-anthraquinone by oxygen and also being such that it is a hydrogen acceptor and has a redox potential in water more positive than −1.48 volts as compared with the saturated calomel electrode.

11 Claims, No Drawings

PRODUCTION OF BIS-QUATERNARY SALTS OF 4:4'-BIPYRIDYLS

This invention relates to the production of 1,1'-disubstituted-4:4'-bipyridylium salts.

In U.K. Patent Specification No. 1,073,081 which corresponds to U.S. Pat. No. 3,405,135 dated Oct. 8, 1968 there is described a process for the production of N:N'-(or 1,1'-)disubstituted-4:4'-bipyridylium salts by the oxidation of an N:N'-(or 1,1'-)disubstituted-tetrahydro-4:4'-bipyridyl using an organic oxidizing agent which is a hydrogen acceptor and which has a redox potential in water more positive than −1.48 volts as compared with the saturated calomel electrode.

We have now found that N:N'-disubstituted-1,1',4,4'-tetrahydro-4:4'bipyridyls may advantageously be converted to the corresponding bipyridylium salts by the use of particular oxidizing agents which can be regenerated by oxygen.

Thus according to the present invention we provide a process for the production of a 1,1'-disubstituted-4:4'-bipyridylium salt which comprises treating a 1,1'-disubstituted-1,1',4,4'-tetrahydro-4:4'-bipyridyl with a 2-alkyl-9,10-anthraquinone, the 2-alkyl-9,10-anthraquinone being such that the corresponding 9,10-anthraquinol can be oxidized to the substituted 9,10-anthraquinone by oxygen and also being such that it is a hydrogen acceptor and has a redox potential in water more positive than −1.48 volts as compared with saturated calomel electrode.

The substituted 9,10-anthraquinone preferably has no substituent on its alpha-carbon atoms as we have found that such substituents tend to slow the rate of reaction, possibly by steric hindrance of the 9 and/or 10 positions. If, however, alpha-substituents are present they should preferably be few and small if a high rate of reaction is required. The alkyl group of the substituted 9,10-anthraquinone preferably contains from one to eight carbon atoms, especially one to four carbon atoms. Examples of particularly suitable alkyl groups which may be present are methyl, ethyl, n-butyl, iso-butyl and tert.-butyl groups.

The 1,1'-disubstituted-tetrahydro-4:4'-bipyridyl may be in particular a 1,1'-dialkyl-tetrahydro-4:4'-bipyridyl or a 1,1'-dicarbamidoalkyl-tetrahydro-4:4'-bipyridyl; the latter are more fully described in U.K. Patent specification No. 1,073,082.

The reaction may be conveniently carried out in solution in an inert solvent which will dissolve both the 1,1'-disubstituted-tetrahydro-4:4'-bipyridyl and the 2-alkyl-9,10anthraquinone. 2-alkyl-9,10-anthraquinones are not in general readily soluble in organic solvents but we have in general found that suitable solvents can be selected from the following groups; ethers, for example diethyl ether, tetrahydrofuran and bis(2-methoxyethyl) ether; ketones, for example acetone and methyl ethyl ketone; hydrocarbons for example alpha- and beta- methyl naphthalenes, benzene and alkyl benzenes such as dodecyl benzene and those known in commerce as "Aramasols"; inert halogenated hydrocarbons, particularly chlorinated hydrocarbons, dimethyl formamide; alcohols, for example diisobutyl carbinol and long-chain fatty alcohols, for example palm kernel alcohol. Mixtures of any two or more organic solvents may be employed, especially mixtures of alpha-methyl naphthalene and diisobutyl carbinol or palm kernel alcohol; in these particular mixtures the solubility of the 2-alkyl-9,10-anthraquinone may be as high as 20 percent by weight of the resulting solution.

The rate of reaction depends on the particular 2-alkyl-9,10-anthraquinone used and the temperature at which the reaction is carried out. We have found that in general times of as little as 2.0 hours may be suitable for producing optimum yields in reactions involving 2-alkyl-9,10-anthraquinones in which the alpha positions are free of substitution.

The reaction is preferably carried out at a temperature of from 0°–70° C, and especially at a temperature of from 30°–60° C.

Suitable proportions of reactants are at least 2 moles of the 2-alkyl-9,10-anthraquinone for each mole of the 1,1'-disubstituted-1,1',4,4'-tetrahydro-4,4'-bipyridyl. In general we have found that the rate of reaction increases with an increased proportion of the 2-alkyl-9,10-anthraquinone.

The reaction product contains the 1,1'-disubstituted-4,4'-bipyridylium salt of the reduced or partially reduced 2-alkyl-9,10-anthraquinone, for example a salt of formula:

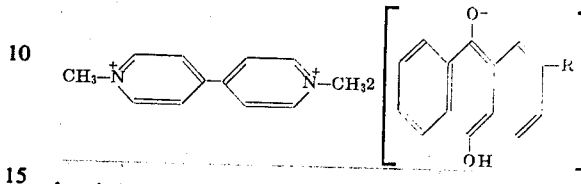

wherein R is an alkyl group. These salts can be converted into the more conventional 1,1'-disubstituted-4,4'-bipyridylium salts with the liberation of a substituted 9,10-anthraquinol by treatment with an acid which is a stronger acid than the substituted 9,10-anthraquinol, for example an aqueous solution of a mineral acid, for example hydrochloric acid, sulphuric acid, phosphoric acid or acetic acid.

The bipyridylium salt and the 9,10-anthraquinol so formed can be separated one from the other and recovered by conventional means. Thus for example the 9,10-anthraquinol can be separated from the bipyridylium salt by partition between water (which preferentially retains the bipyridylium salts, and any quaternary salts produced by cleavage of the N:N'-disubstituted-tetrahydro-4:4'-bipyridyl) and a water-immiscible solvent such as an ether or hydrocarbon (which preferentially dissolves the 9,10-anthraquinol).

The aqueous phase containing the bipyridylium salt usually also contains some N-substituted pyridinium salts produced by a side reaction in which cleavage of the 1,1'-disubstituted-tetrahydro-4,4'-bipyridyl occurs and it may be economically desirable to separate these N-substituted pyridinium salts from the bipyridylium salts, for example by the selective precipitation method more fully described in our U.K. Patent specification 1,073,824. N-substituted pyridinium salts recovered in this way can be converted by reduction into 1,1'-disubstituted-1,1',4,4'-tetrahydro-4,4'-bipyridyls, for example, by the reduction processes more fully described in our U.K. Patent specifications Nos. 1,073,082 and 1,075,323.

The 2-alkyl-9,10-anthraquinol may be isolated from the solvent phase simply by evaporation of the solvent. It may be converted back to the corresponding 2-alkyl-9,10-anthraquinone by oxidation, for example by treatment of a solution containing the 2-alkyl-9,10-anthraquinol directly with an oxygen-containing gas, for example, air. The oxygen-containing gas may be contacted with the solution in any way conventional for the contact of liquids and gases, for example, by bubbling the gas through the solution. The 2-alkyl-9,10-anthraquinol need not be isolated prior to converting it to the anthraquinone.

While we prefer to use oxygen for the conversion of the 2-alkyl-9,10-anthraquinol to the corresponding 9,10-anthraquinone, other oxidants, for example, chlorine, may alternatively be used. A particular advantage of using oxygen, however, is that hydrogen peroxide is formed during the conversion; this can be isolated as a useful byproduct of the process. The oxidation of the 2-alkyl-9,10-anthraquinol may be conveniently carried out at ambient temperatures, but we have found that an increase in temperature tends to increase the rate of reaction.

The invention is illustrated but in no way limited by the following examples.

EXAMPLES 1 TO 20

A solution of 1,1'-dimethyl-1,1',4,4'-tetrahydro-4,4'-bipyridyl (0.015 mls) in a 1:1 mixture of di-isobutyl carbinol and methyl naphthalene (50 mls) was added dropwise to a stirred solution of 2-ethyl-9,10-anthraquinone (8.0 gms – 0.034 mole) in the same solvent mixture (50 mls) at 20° C.

The mixture was stirred for a further 4 hours after which time it was cooled in ice/water and to it was added 2N aqueous hydrochloric acid (100 mls). The resulting aqueous phase was separated and was found to contain the 1,1'-dimethyl-4,4'-bipyridylium ion (0.0112 mole) representing a reaction efficiency of 74.5 percent based on the tetrahydrobipyridyl fed.

The organic phase, which contained a dihydro-anthraquinone (the anthraquinone reduction product) was treated with air (oxygen gas) to produce 2-ethyl-9,10-anthraquinone and hydrogen peroxide. The hydrogen peroxide was extracted with water and the final organic phase was found to contain 8.0 gms of the 2-ethyl-9,10-anthraquinone, representing quantitative recovery of this material.

The above procedure was repeated (Examples 2 to 18) using the anthraquinone and reaction conditions specified in the Table below.

Two further experiments were then carried out (Examples 19 and 20) wherein the procedure was as described above except that order of addition of the initial reagents was reversed, i.e., the solution of the anthraquinone was added to the solution of the tetrahydrobipyridyl.

TABLE

| Example No. | Anthraquinone | Mole | Solvent* (ml.) | Temp. (° C.) | Time (hrs.) | Reaction efficiency (percent) |
|---|---|---|---|---|---|---|
| 1 | 2-ethyl-9,10-anthraquinone | 0.034 | A-100 | 20 | 4 | 74.5 |
| 2 | do | 0.10 | A-100 | 45 | 4 | 73.2 |
| 3 | do | 0.034 | A-200 | 20 | 4 | 64.8 |
| 4 | do | 0.10 | A-200 | 20 | 4 | 74.5 |
| 5 | do | 0.10 | A-200 | 45 | 4 | 73.5 |
| 6 | do | 0.034 | B-50, A-50 | 20 | 4 | 60.0 |
| 7 | do | 0.034 | B-50, A-150 | 60 | 2 | 65.0 |
| 8 | do | 0.034 | B-50, C-50 | 20 | 4 | 70.5 |
| 9 | do | 0.034 | B-50, D-50 | 40 | 4 | 74.0 |
| 10 | do | 0.034 | B-50, E-50 | 40 | 4 | 55.0 |
| 11 | do | 0.034 | B-50, F-100 | 40 | 4 | 35.4 |
| 12 | do | 0.034 | A-100 | 55 | 2 | 71.5 |
| 13 | 2-tert.butyl-9,10-anthraquinone | 0.034 | A-100 | 20 | 2 | 65.5 |
| 14 | do | 0.034 | B-50, A-50 | 40 | 2 | 70.0 |
| 15 | do | 0.036 | A-100 | 20 | 4 | 70.5 |
| 16 | do | 0.034 | A-100 | 60 | 2 | 67.5 |
| 17 | do | 0.034 | A-100 | 40 | 2 | 65.5 |
| 18 | do | 0.034 | A-100 | 40 | 2 | 65.0 |
| 19 | do | 0.034 | A-100 | 20 | 2 | 51.2 |
| 20 | 2-ethyl-9,10-anthraquinone | 0.034 | B-50, A-150 | 20 | 4 | 52.2 |

The reaction efficiency is in each case based on the tetrahydrobipyridyl fed.

*Solvent:
A = 1:1 mixture of di-isobutyl carbinol and methyl naphthalene
B = toluene
C = acetonitrile
D = dimethylformamide
E = diglyme
F = diethyl ether

What we claim is:

1. In a process for the production of a 1,1'-disubstituted-4,4'-bipyridylium salt which consists essentially of reacting a 1,1'-disubstituted-1,1',4,4'-tetrahydro-4,4'-bipyridyl selected from the group consisting of 1,1'-dilower alkyl-1,1',4,4'-tetrahydro-4,4'-bipyridyl and 1,1'-dicarbamido lower alkyl-1,1',4,4-tetrahydro-4,4'-bipyridyl, with an organic compound, that is a quinone which is a hydrogen acceptor and which has a redox potential in water more positive than −1.48 volts as compared with the saturated calomel electrode in the presence of an inert organic solvent, the improvement consisting of employing as the organic compound an oxygen-regenerable 2-alkyl-9,10-anthraquinone wherein the alkyl group contains from one to eight carbon atoms at a temperature range of from 0° to 70° C.

2. A process as claimed in claim 1 wherein there is used a mixture of alpha methyl naphthalene and di(isobutyl) carbinol.

3. A process as claimed in claim 1 wherein the temperature is from 30° to 60° C.

4. A process as claimed in claim 1 wherein there are employed at least two moles of the 2-alkyl-9,10-anthraquinone per mole of the tetrahydro-bipyridyl.

5. A process as claimed in claim 1 wherein the resulting 1,1'-disubstituted-4,4'-bipyridylium salt is treated with an acid to form a 1,1'-disubstituted-4,4'-bipyridylium salt of the acid and a 2-alkyl-9,10-anthraquinol.

6. A process as claimed in claim 8 wherein the 1,1'-di-substituted-4,4'-bipyridylium salt of the acid and the 2-alkyl-9,10-anthraquinol are separated by partition between water and a water-immiscible organic solvent.

7. A process as claimed in claim 1 wherein the 2-alkyl-9,10-anthraquinone is unsubstituted in the alpha positions.

8. A process as claimed in claim 1 wherein the pyridinium salt is a 1,1'-dialkyl-1,1',-4,4'-tetrahydro-4,4'-bipyridyl.

9. A process as claimed in claim 8 wherein the alkyl groups each contain from one to eight carbon atoms.

10. A process as claimed in claim 9 wherein the alkyl groups each contain from one to four carbon atoms.

11. A process as claimed in claim 1 wherein the pyridinium salt is a 1,1'-di(carbamidoalkyl)-1,1',4,4'-tetrahydro-4,4'-bipyridyl.

* * * * *